United States Patent [19]

Kosmatka

[11] Patent Number: 5,142,455
[45] Date of Patent: Aug. 25, 1992

[54] VEHICLE HEADLAMP IN WHICH MULTIPLE BEAMS ARE DERIVED FROM A SINGLE DISCHARGE-TYPE LIGHT SOURCE

[75] Inventor: Walter J. Kosmatka, Highland Heights, Ohio

[73] Assignee: General Electric Company, Schenectady, N.Y.

[21] Appl. No.: 710,639

[22] Filed: Jun. 5, 1991

[51] Int. Cl.$^5$ .............................................. B60Q 1/068
[52] U.S. Cl. ...................................... 362/61; 362/277; 362/284
[58] Field of Search ................. 362/61, 270, 271, 272, 362/274, 261, 66, 277, 284, 319, 324

[56] References Cited

U.S. PATENT DOCUMENTS

| | | | |
|---|---|---|---|
| 4,827,388 | 5/1989 | Miyazawa | 362/284 |
| 4,881,152 | 11/1989 | Watanabe et al. | 362/61 |
| 5,023,758 | 6/1991 | Allen et al. | 362/61 |

Primary Examiner—Ira S. Lazarus
Assistant Examiner—L. Heyman
Attorney, Agent, or Firm—George E. Hawranko; Stanley C. Corwin; Fred Jacob

[57] ABSTRACT

This vehicle headlamp comprises a housing adapted to be fixed to the body of a vehicle and having a light-transmissive portion through which upper and lower beams are directed. Within the housing is a discharge-type lamp serving as the light source for both these beams and an arrangement for mounting this lamp in a fixed location with respect to the housing. Also located within the housing is a reflector that is mounted on the housing in such a manner as to permit relative movement between the reflector on one hand and the housing and the lamp on the other hand. An actuating arrangement causes movement of the reflector between two spaced-apart positions while the lamp remains fixed relative to the housing. The reflector in one of said positions causes light from the lamp to be reflected from the reflector as the upper beam, and the reflector in its other position causes light from the lamp to be reflected from the reflector as said lower beam.

11 Claims, 4 Drawing Sheets

VEHICLE HEADLAMP IN WHICH MULTIPLE BEAMS ARE DERIVED FROM A SINGLE DISCHARGE-TYPE LIGHT SOURCE

FIELD OF THE INVENTION

This invention relates to a vehicle headlamp that includes as its light source a discharge-type lamp and, more particularly, relates to a headlamp of this type in which multiple beams can be derived from the discharge-type lamp.

BACKGROUND

In a typical dual-beam headlamp there are two filaments that are located in carefully-selected, spaced locations within the usual reflector of the headlamp. One of the filaments is energized to produce a lower beam, and the other is energized to produce an upper beam. The spatial separation between the two filaments is relied upon to create the desired beam shift between the upper and lower beams. The lower beam is normally aimed as shown in FIG. 1 of the drawings of the present application, and the upper beam is aimed as shown in FIG. 2 of these drawings. These FIGS. 1 and 2 depict a screen located in a target plane in front of a vehicle, the screen being viewed from the vehicle with the headlamp aimed at the screen.

When the lower beam is aimed as in FIG. 1, the top portion of its high intensity zone is at the headlamp's "horizontal" (i.e., a horizontal line 8 located at the point where the headlamp's center line intersects the target plane.) The leftmost edge of the high intensity zone of the beam of FIG. 1 is at the headlamp's "vertical" (i.e., a vertical line 9 located at the point where the headlamp's center line intersects the target plane).

The upper beam, on the other hand, is aimed so that the central area of its high intensity zone is aimed at the intersection of the headlamp's horizontal and vertical, as seen in FIG. 2. Thus, by design, the upper beam is shifted up and to the left of the lower beam, as viewed from the vehicle. As viewed looking into the headlamp, such shifting is up and to the right.

Given that the reflector is of a parabolic shape and has a predetermined focal length, one can determine that a given source displacement (upper-beam source position versus lower-beam source position) will yield a predictable beam displacement. Accordingly, the filaments in a dual filament headlamp have been designed with a controlled lateral displacement (offset) from the headlamp center line and a controlled vertical displacement (spacing) from this center line.

A headlamp that utilizes a discharge-type light source has design characteristics unlike the incandescent headlamp referred to above. Instead of relying upon filaments, as above described, the discharge-type light source relies upon an arc, or arcs, within an arc chamber to generate the desired light. The operation of this type of lamp is materially affected by the shape and size of the arc chamber. One might approach this problem by providing a quartz arc chamber and means for developing within the chamber two arc paths analogous to the two filaments used to create the above-described lower beam and upper beam. This approach would require within the arc chamber dual sets of electrodes, along with associated lead wires and control circuits. Such a lamp would be difficult to design and manufacture in view of the large number of parts that would have to be sealed to the quartz arc chamber and the necessity for a high degree of precision in locating such parts relative to each other and in shaping the arc chamber.

An alternate approach employs a dual reflector system, each reflector having its own arc source and starting circuit. A significant problem with such a scheme is that the additional reflector and arc source call for an additional arc tube and mount hardware and additional electronics and circuitry, and this has a significant adverse effect on product size and cost.

The use of two arc tubes in a single reflector would overcome some of the cost penalties of duplicate reflectors. However, the physical size of the arc tubes prevents placing them in close enough proximity, typically about 0.05 inches to 0.15 inches, required to maintain the proper relationship between the upper and lower beams.

OBJECTS

An object of my invention is to provide a headlamp that derives multiple beams from a single discharge-type lamp without requiring that the lamp be capable of developing more than one arc path.

Another object is to provide a multiple-beam headlamp that includes a single discharge-type light source and is constructed in such a way that there is no need for instant starting of an arc in a beam-switching situation.

Still another object is to provide a multiple-beam headlamp having a discharge-type light source that is so constructed as to allow for the use of a glass reflector, which is relatively inexpensive compared to a reflector made of the type of polymer material required for this duty and is unaffected by the internal heat of the system and the high ultraviolet radiation emanating from the arc tube.

Other objects and advantages will become apparent as the detailed description of embodiments of the invention proceeds.

SUMMARY

In carrying out the invention in one form, I provide a vehicle headlamp that comprises a housing adapted to be fixed to the body of the vehicle and having a light-transmissive portion through which upper and lower beams of the headlamp are directed. Within the housing is a discharge-type lamp serving as the light source for both of these beams. Means is provided for mounting this lamp in a fixed location with respect to the housing. Also located within the housing is a reflector that extends about the lamp. Means is provided for mounting the reflector on the housing in such a manner as to permit relative movement between the reflector on one hand and the housing and lamp on the other hand. Actuating means is provided for causing movement of the reflector between two spaced-apart positions while the lamp remains fixed relative to the housing. The reflector in one position causes light from the lamp to be reflected from the reflector through said light-transmissive portion as the upper beam. The reflector in its other position causes light from said lamp to be reflected from said reflector through said light-transmissive portion as said lower beam.

In a specific embodiment of the invention, the reflector-mounting means comprises a plurality of resilient tabs located at spaced locations on the exterior of the reflector. Each tab has two ends, one of which is connected to the housing and the other of which is connected to the reflector.

BRIEF DESCRIPTION OF FIGURES

For a better understanding of the invention, reference may be had to the following detailed description taken in connection with the accompanying drawings, wherein.

DETAILED DESCRIPTION OF EMBODIMENT

Figure 1:
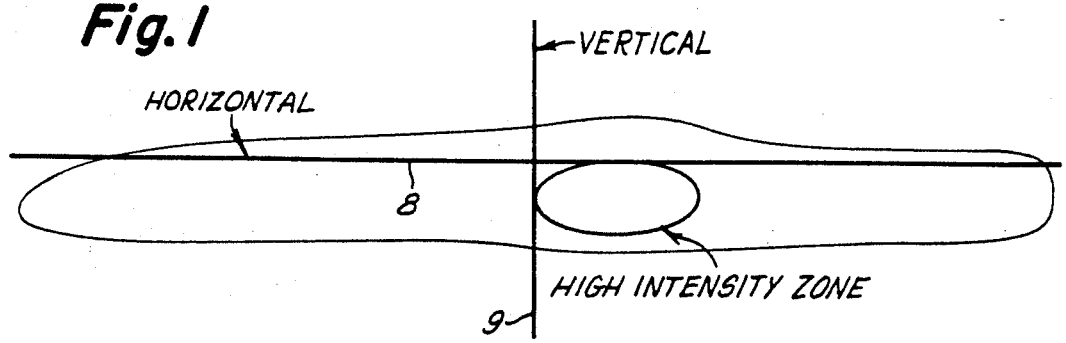
FIG. 1 is a view depicting a screen located in a target plane in front of a vehicle, the screen being viewed from the vehicle with the lower beam of the vehicle headlamp correctly aimed and having its high intensity portion showing on the screen.
Figure 2:
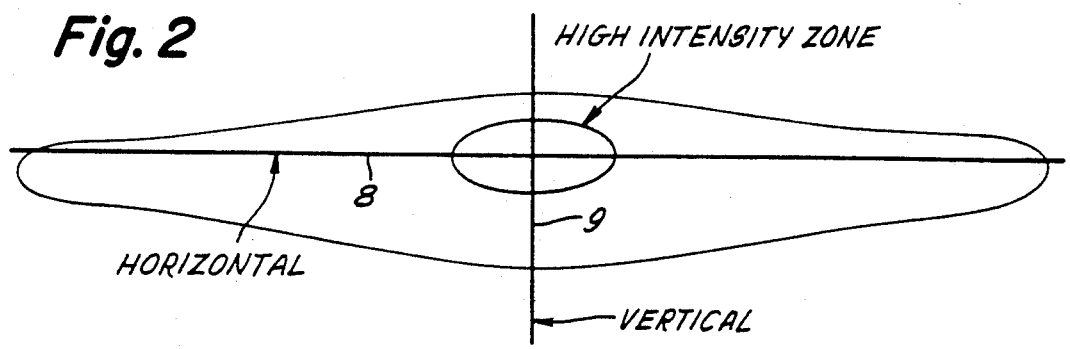
FIG. 2 depicts the screen of FIG. 1 viewed as in FIG. 1 except while a correctly-aimed upper beam of the headlamp shows on the screen.
Figure 3:
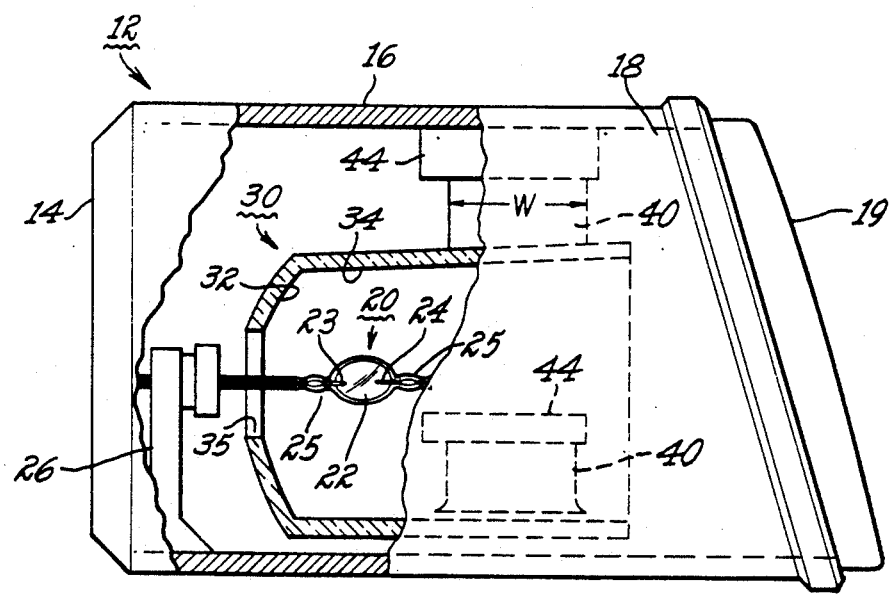
FIG. 3 is a side elevational view, partly in section, of a headlamp embodying one form of my invention.
Figure 4:
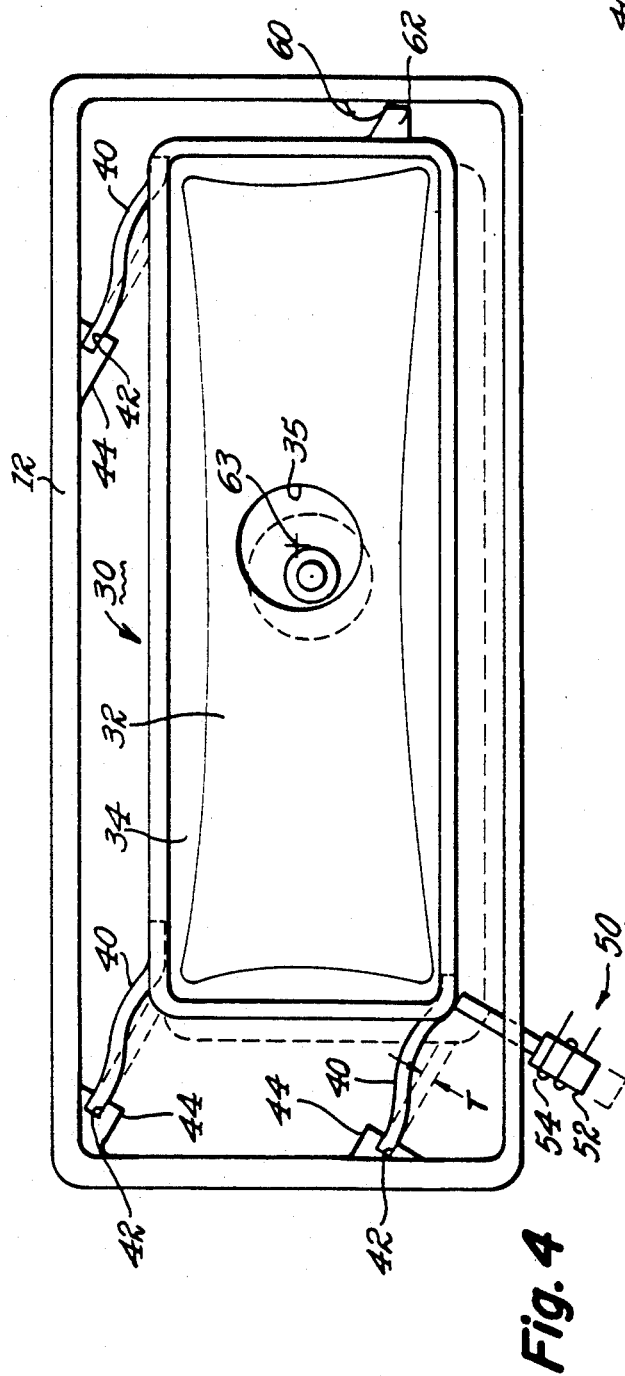
FIG. 4 is a front view of the headlamp of FIG. 3 with the headlamp lens removed.

Referring now to FIGS. 3 and 4, the vehicle headlamp shown therein comprises a housing 12 that is adapted to be mounted on and fixed to the body of a vehicle. This housing 12 comprises a back wall 14, a tubular body portion 16 of rectangular cross-section as viewed in FIG. 4, a front end 18 having a central opening, and a lens 19 of conventional form aligned with this opening and suitably secured to the front end 18.

Within the housing 12 is a discharge-type lamp 20 of conventional form that serves as the light source for the headlamp. The lamp 20 includes an arc chamber 22 and, within the arc chamber, two spaced-apart electrodes 23 and 24 between which a discharge, or arc, is developed when the headlamp is to be operated.

In the illustrated form of the invention, the arc chamber 22 is of quartz and has two integral neck portions 25 also of quartz projecting from its opposite ends. The conductive leads to the electrodes 23 and 24 extend in sealed relationship through these neck portions 25 and are suitably connected at their outer ends to an external circuit (not shown) that includes a ballast and a starter. One of the neck portions 25 is substantially longer than the other and is used for supporting the lamp 20 within the housing 12. A lamp of this construction is more specifically disclosed and is claimed in U.S. Pat. No. 4,810,932 - Ahlgren et al, assigned to the assignee of the present invention. See for example, the lamp 120 of FIGS. 5 and 10 of the patent.

The lamp support comprises a pedestal 26 suitably fixed at its lower end to the housing 12. At its upper end this pedestal 26 has an opening through which the longer neck portion 25 of the lamp extends. Suitable coupling means of conventional form is utilized for fixing the neck portion to the upper end of the pedestal 26. Accordingly, the lamp 20 is fixed with respect to the housing 12, and the arc developed between electrodes 23 and 24 during lamp operation occupies a fixed position with respect to housing 12.

Also located within the housing 12 and extending about the lamp 20 is a reflector 30 that has a parabolic rear wall 32 and a tubular portion 34 of generally rectangular cross-section, as viewed in FIG. 4, projecting forwardly from the rear wall. The rear wall 32 of the reflector contains a relatively large opening 35 surrounding the supporting neck 25 of the lamp that allows for motion of the reflector with respect to housing 12, as will soon be described, without disturbing the neck or the associated lamp 20. Preferably, the reflector is made primarily of glass, but my invention in its broader aspect comprehends the use of suitable polymeric materials, or even metal, for the reflector. The glass reflector's inner surface is coated with a suitable metal to provide a good reflective surface thereon for receiving light from the lamp 2 and reflecting this light through the lens 19 at the front of the headlamp.

Figure 5:
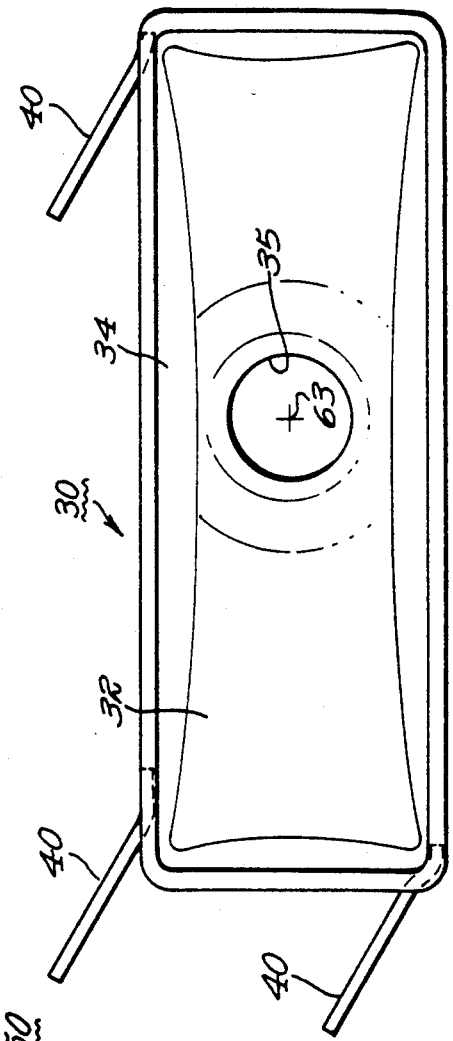
FIG. 5 is a front view of a reflector used in the headlamp of FIGS. 3 and 4, showing the reflector before assembly into the headlamp.

The reflector 30 is mounted in such a manner that is can be moved with respect to the housing 12 and with respect to the lamp 20. More specifically, as shown in FIG. 4, there are three flexible and resilient tabs 40 attached to the glass reflector adjacent three of its four corners. These tabs 40 can be of either a suitable metal or a suitable polymer. They can be molded into the glass of the reflector, or attached to the reflector body with suitable fastening devices or with a suitable adhesive. These resilient tabs 40, when unstressed, extend from the reflector in parallel relationship to each other as seen in FIG. 5. When the headlamp is fully assembled, the outer ends of the tabs are rigidly attached to the housing 12. In the embodiment of FIG. 4 such attachment is effected by slots 42 provided in bosses 44 on the internal surface of the housing. Assembly of the headlamp is effected by introducing the reflector 30 through the front opening in housing 12 with the tabs 40 positioned in alignment with the slots 42. The slots 42 have open ends facing the front of the headlamp so that the tabs may enter the slots during such assembly. The reflector is then forced further into the housing 12, forcing the tabs along the slot length until the reflector is in its position of FIG. 3. The fit between the slots 42 and the tabs 40 is sufficiently tight as to hold the outer ends of the tabs in their assembled positions within the slots during the lifetime of the headlamp. The tabs 40 have a thickness T (FIG. 4) that is much less than their width dimension W shown in FIGS. 3 and 5. This cross-sectional configuration of the tabs and the tab orientation permit the tabs to flex in the desired direction (depicted in FIG. 4) but not in any other direction. When the reflector is in its dotted line position of FIG. 4, the tabs 40 of the FIG. 4 embodiment are unflexed and the reflector is positioned so that it is effective to reflect the light received from lamp 20 through the lens 19 via a lower beam.

When the reflector has been moved into its solid-line position of FIG. 4, the tabs 40 are fully flexed and the reflector is then positioned to reflect light received from lamp 20 through the lens 19 via an upper beam.

For shifting the reflector between its dotted-line position of FIG. 4 and its solid-line position of FIG. 4, any suitable conventional actuator can be provided. In the illustrated embodiment, this actuator takes the form of a solenoid schematically shown at 50 and having an armature 52 and a coil 54 surrounding the armature. When the coil 54 is energized, the armature is driven upwardly and to the right from its dotted-line into its solid-line position, thereby driving the reflector from its dotted-line into its solid-line position. As shown in FIG. 4, a stop 60 on the inner surface of the housing portion 16 is positioned to limit the above-described upward motion of the reflector by engaging a complementary stop 62 on the reflector. This upward motion of the reflector flexes the tabs 40 and causes them to develop a restoring force biasing the reflector in a direction toward its dotted-line position. So long as the solenoid coil 54 remains energized, the reflector remains in its solid-line position; but when the solenoid coil is deenergized, the above-described restoring force returns the reflector to its dotted-line, lower-beam position.

When the reflector 30 is moved between its dotted-line position and its solid-line position, the focal point 63 of the reflector is shifted with respect to the arc source within lamp 20; and this shifting, by virtue of the design of the headlamp optics, shifts the beam pattern into the desired new orientation. The stops 60 and 62 are so located that the total movement of the reflector 30 and its focal point is that which is required to produce the required shift in beam pattern.

Figure 9:
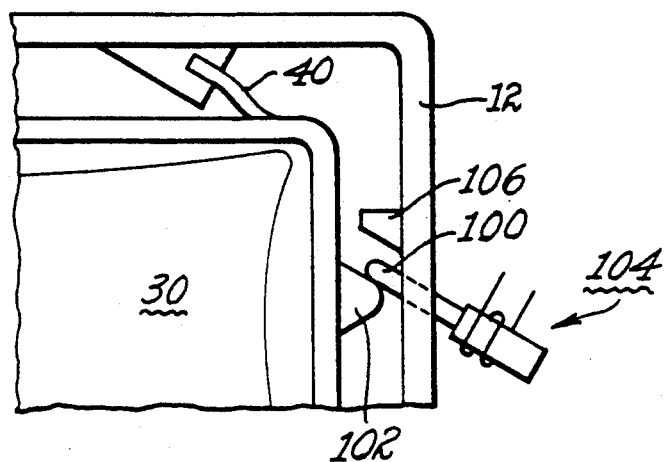
FIG. 9 is a fragmentary view similar to FIG. 7 except showing another modified form of the headlamp.

While in the embodiment of FIGS. 3-6 the tabs 40 are unflexed when the reflector is in its lower beam position, it is to be understood that my invention in its broader aspects comprehends an arrangement in which the tabs are flexed when the reflector is in its lower beam position and the reflector is restrained in this lower beam position by a suitable stop or other restraining means. In this latter arrangement, the lower beam position of the reflector is not determined solely as a function of the tab design but rather by contact with a stop or by the mechanical actuator itself. FIG. 9 illustrates such an arrangement. The stop 100 of FIG. 9 is engaged by a stop 102 on the reflector and thus determines the lower beam position of the reflector. Stop 100 is controlled by a solenoid 104, which may be operated to render the stop 100 ineffective and allow the main operating solenoid 50 (FIG. 4) to actuate the reflector upwardly and to the right. This latter movement is limited by a stop 106 on the housing 12, which engages the reflector stop 102 to determine the upper beam position of the reflector. It will be noted in FIG. 9 that the tab 40 is partially flexed when the reflector is in its illustrated lower beam position. The other tabs 40 (not shown in FIG. 9) are also partially flexed when the reflector is in its FIG. 9 position.

While in the illustrated embodiments, I mount the reflector so that it can be shifted in only two planes, it is to be understood that my invention in its broader aspects comprehends use of a reflector-mounting arrangement that permits shifting of the reflector in any of three planes. Such a mounting arrangement can be provided by proper selection of the location and orientation of flexure tabs such as 40 of FIGS. 3-6.

Figure 8:
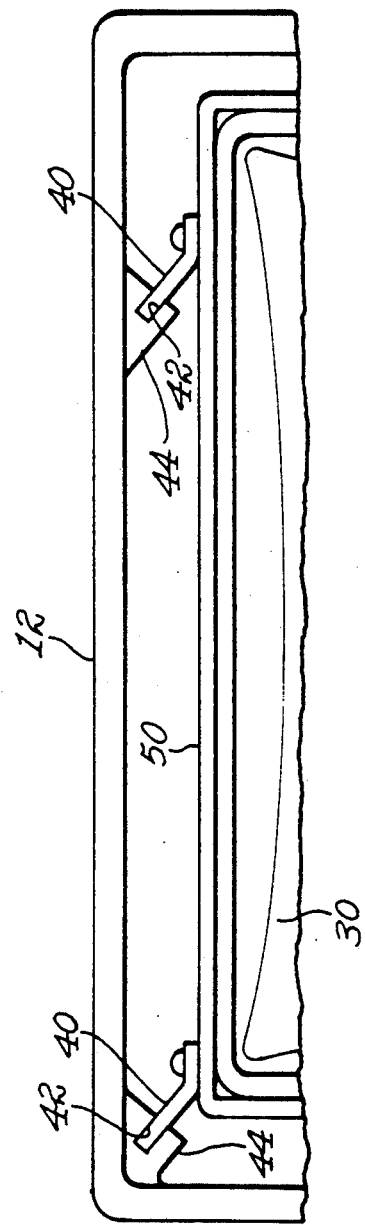
FIG. 8 is a fragmentary view showing another modified form of the headlamp.

While the embodiment of FIGS. 3-6 comprises flexure tabs 40 that are fixed to the reflector by directly connecting them to the reflector, as by integrating them with the reflector during the molding process used for making the reflector, the tabs can be otherwise secured to the reflector. For example, they can have their inner ends secured to a metal or polymeric band 50 that embraces the reflector, as shown in FIG. 8. After this band is properly mounted within the housing 12 through tabs 40, the reflector 30 can be inserted into this band and thereafter secured in place within the band, using for this purpose any suitable adhesive or mechanical retention means. Using a band such as 50 enables the tabs 40 to be inserted into slots 42 before the tabs are attached to the band. Accordingly, the slots 42 in the bosses 44 can be oriented in any desired manner, following which the band 50 is introduced and the tabs are attached at their inner ends to the band 50. Thereafter the reflector 30 is inserted into the surrounding band and then secured in place within the band.

While the illustrated embodiments rely upon spring means (in the form of flexible tabs 40) for mounting the reflector 30 for movement with respect to housing 12, it is to be understood that my invention in its broader aspects comprehends the use instead of other means for such mounting, for example, a suitable mechanical linkage connected between the housing and the reflector that can be actuated to produce the desired shift in reflector position.

While each of the above-described embodiments employs a single non-adjustable stop (60 or 106) on the housing 12 for establishing the displaced position of the reflector, my invention in its broader aspects comprehends the use of multiple stops which can be selectively rendered effective to define more than one displaced position. More specifically, referring to FIG. 7, the housing has a first stop 80 that engages stop 62 on the reflector to establish the normal displaced position of the reflector, but this first stop can be withdrawn, e.g., by the solenoid 82 illustrated, thereby rendering the first stop 80 ineffective. A second stop 84 vertically spaced from the first stop 80 is thus rendered effective to limit motion of the reflector. Displacement of the reflector into this more displaced position enables one to derive a beam more suited to other than normal driving tasks.

Figure 7:
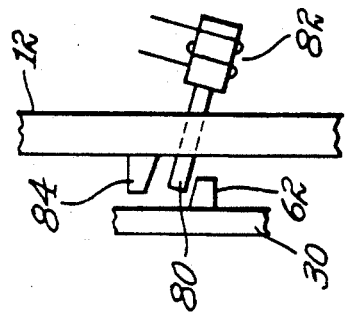
FIG. 7 is a view similar to FIG. 4 except showing a modified form of headlamp.
Figure 6:
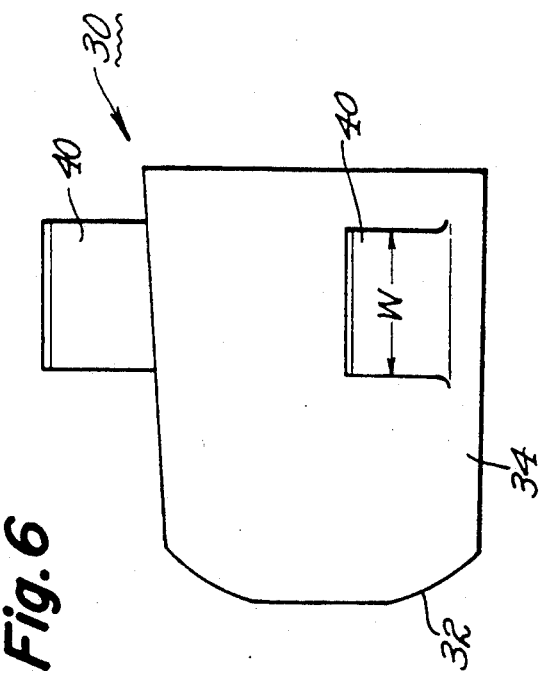
FIG. 6 is a side elevational view of the reflector of FIG. 5.

It will be apparent that an even greater number of mechanically-actuable stops can be provided than is shown in FIG. 7. By suitably locating these stops, one can provide many variations of beam pattern, e.g., beams suited for inclement weather, normal low beam driving, turnpike driving, and unopposed driving. While an appropriate lens design is needed in order to accommodate these various beam patterns, it is noteworthy that these beam patterns are all derived from a single source and a single reflector.

Figure 10:
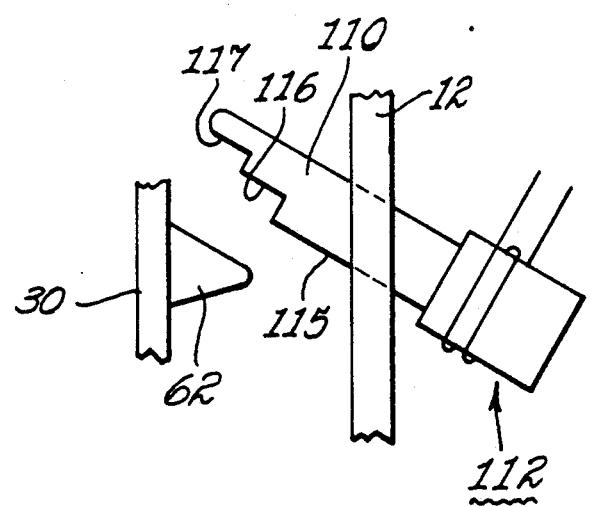
FIG. 10 is a fragmentary view similar to FIGS. 7 and 9 except showing still another modified form of the headlamp.

FIG. 10 illustrates a multiple stop arrangement of the type referred to in the immediately-preceding paragraph. The abutment 110 of FIG. 10 is withdrawable in steps by the solenoid 112. A first surface 115 on abutment 110 represents a first stop; a second surface 116 represents a second stop; and a third surface 117 represents a third stop. When the abutment 110 is in its illustrated position, surface 115 is in the path of the movable stop 62 on the reflector and thus determines a first displaced position for the reflector when the reflector is actuated by the main solenoid 50 (FIG. 4). When the abutment 110 is moved one step to the right by solenoid 112, surface 115 is disabled as a stop and surface 116 enters the path of the movable stop 62 and thus determines a second displaced position for the reflector when the reflector is actuated by the main solenoid 50 of FIG. 4. When the abutment 110 is moved two steps to the right by solenoid 112, surface 116 is disabled as a stop and surface 117 enters the path of the movable stop 62 on the reflector and thus determines a third displaced position for the reflector when the reflector is actuated by the main solenoid 50 of FIG. 4.

GENERAL DISCUSSION

It will be apparent from the above detailed description that this invention has a number of important advantages that enable me to overcome significant cost and design difficulties associated with arc discharge systems for vehicle headlamps. One such advantage is that the invention enables me to use a single simple arc tube for each side of a car, thus avoiding the need for multiple headlamps at each side of the car or the need for multiple arc tubes within a single headlamp or the need for a complicated arc tube capable of developing multiple arc paths therein. Use of a single arc tube at each side of the vehicle also enables me to use only a single ballast and a single starter for each side of the vehicle.

Another advantage of my invention is that it reduces the number of times a specific light source will be started since in switching from upper to lower beams or from lower to upper beams, there is no need to turn the source 20 on or off. In my device the arc tube source (20) is on at all times and is not extinguished while another is lighted.

Moreover, there is no need with my headlamp for instant starting in a "beam switching" situation since the single arc tube remains lit at all times.

Another advantage is that my construction allows the reflector to be made of glass, which is less costly than the polymer materials usable for this application and is unaffected by the internal heat of this system and the high ultraviolet radiation emanating from the arc tube.

Still another advantage of the illustrated embodiments is that they use simple flexure components (40) for precisely positioning the reflector, and such components are not prone to frictional losses or loss of precision over multiple cycles.

Still another advantage of the illustrated embodiment is that it does not require that some portion of the reflector be used to seal the system against the surrounding environment since the reflector is located entirely within the housing 12, which can be sealed independently of the reflector.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

For instance, although the resilient tabs 40 are shown as having two opposite ends, one of which attaches to the reflector 30 while the other attaches to the housing 12, it can be appreciated that resilient connectors having additional ends as could occur with an X-shaped resilient connector, could be used as well.

What I claim as new and desire to secure by Le Patent of the United States is:

1. A vehicle headlamp comprising:
   (a) a housing adapted to be fixed to the body of a vehicle and having a light-transmissive portion through which upper and lower beams developed within the headlamp are directed,
   (b) a discharge-type lamp within said housing serving as the light source for both of said beams,
   (c) means for mounting said lamp in a fixed location with respect to said housing,
   (d) a reflector located within said housing and extending about said lamp,
   (e) means for mounting said reflector on said hosing in such a manner as to permit relative movement between said reflector and said housing and between said reflector and said lamp, said mounting means including a plurality of resilient connecting members each having at least two ends associated therewith and wherein one end of each connecting member is connected to said reflector, and
   (f) actuating means for causing movement of said reflector between two spaced-apart positions while said lamp remains fixed relative to said housing, the reflector in one position causing light from said lamp to be reflected from said reflector through said light-transmissive portion as said upper beam and the reflector in the other of said positions causing light from said lamp to be reflected from said reflector through said light-transmissive portion as said lower beam.

2. The headlamp of claim 1 in which said mounting means comprises a plurality of resilient tabs, each having a pair of ends, one of which is connected to said reflector, said tabs being located at spaced locations on the exterior of said reflector.

3. The headlamp of claim 1 in which said connecting members are tabs which are configured and oriented to allow for lateral displacement of said reflector within said housing but are adapted to block displacement of said reflector in a direction parallel to the central axis of the headlamp.

4. The headlamp of claim 1 in which said connecting members are tabs which are substantially unstressed when said reflector is in one of said positions but are substantially stressed when said reflector is moved into the other of said positions, thereby developing a biasing force on said reflector that urges the reflector to return toward said one position.

5. A headlamp as defined in claim 1 and further including:
   (a) a stop on said housing, and
   (b) a stop on said reflector, and in which:
   (c) said stop on said housing engages said stop on said reflector when the reflector is moved by said actuating means from one to the other of said spaced-apart positions.

6. A headlamp as defined in claim 5 in combination with:
   (a) an additional stop that is arranged to be engaged by one of said first two stops when the other of said first two stops is disabled and said actuating means is operated, thereby establishing a third position into which said reflector is movable, and
   (b) means for selectively disabling said other of said first two stops.

7. The headlamp of claim 1 in which said reflector is primarily of glass with a reflective coating thereon.

8. A headlamp as defined in claim 1 and including means for sealing the interior of said housing from the external environment independently of said reflector within the housing.

9. The headlamp of claim 1 wherein said resilient connecting members are effective to bias said reflector toward one of said spaced-apart positions when the reflector is located in the other of said spaced apart positions.

10. A headlamp as defined in claim 1 and further including:
   (a) a stop on said reflector,
   (b) multiple stops on said housing, and (c) means for selectively rendering individual ones of said multiple stops effective to engage the stop on said reflector when the reflector is moved by said actuating means, thereby establishing at least one additional position in addition to said two spaced-apart positions into which said reflector is movable by said actuating means.

11. The vehicle headlamp of claim 1 in which said reflector mounting means comprises:
(a) a hollow band for embracing said reflector and adapted to receive said reflector after the band is mounted within said housing, and
(b) spring means between said band and said housing for supporting said band in a manner that permits relative movement between said band and said housing.

* * * * *